United States Patent [19]

McDaniel

[11] Patent Number: 4,537,869

[45] Date of Patent: Aug. 27, 1985

[54] TETRAVALENT TITANIUM TREATED CALCINED VANADIUM CATALYST WITH TRIALKYLALUMINUM COCATALYST

[75] Inventor: Max P. McDaniel, Bartlesville, Okla.

[73] Assignee: Phillips Petroleum Company, Bartlesville, Okla.

[21] Appl. No.: 672,634

[22] Filed: Nov. 19, 1984

[51] Int. Cl.³ .................................................. C08F 4/64
[52] U.S. Cl. .................................... 502/107; 502/113; 526/116
[58] Field of Search ................................. 502/107, 113

[56] References Cited

U.S. PATENT DOCUMENTS

| | | | |
|---|---|---|---|
| 2,986,557 | 5/1961 | Banks | 260/94.9 |
| 3,018,255 | 1/1962 | Banks | 252/455 |
| 3,244,682 | 4/1966 | Czenkusch et al. | 502/247 X |
| 3,285,890 | 11/1966 | Aftandilian | 260/82.1 |
| 3,371,079 | 2/1968 | Peters et al. | 260/94.9 |
| 3,526,601 | 9/1970 | Fotis, Jr. et al. | 252/430 |
| 3,745,154 | 7/1973 | Kashiwa | 502/113 X |
| 3,787,384 | 1/1974 | Stevens et al. | 260/94.9 |
| 3,899,477 | 8/1975 | Altemore et al. | 502/113 X |
| 4,208,304 | 6/1980 | Fahey | 502/113 X |
| 4,397,761 | 8/1983 | McDaniel et al. | 252/429 C |

Primary Examiner—Patrick P. Garvin
Attorney, Agent, or Firm—French and Doescher

[57] ABSTRACT

A supported vanadium catalyst is provided by impregnating a vanadium compound onto a refractory support, subjecting the resulting support to calcination and thereafter contacting with a titanium component such as titanium tetrachloride. The resulting catalyst is used with a trihydrocarbylaluminum cocatalyst such as triethylaluminum and results in a supported vanadium catalyst having high activity which catalyst is sensitive to molecular weight control agents such as hydrogen.

13 Claims, No Drawings

TETRAVALENT TITANIUM TREATED CALCINED VANADIUM CATALYST WITH TRIALKYLALUMINUM COCATALYST

BACKGROUND OF THE INVENTION

This invention relates to vanadium catalysts for olefin polymerization.

Vanadium compounds display catalytic activity in a number of diverse chemical reactions. Since vanadium is closely related to both chromium and titanium in the Periodic Table, it is only natural that it has been tried in place of chromium or titanium as a catalyst for the polymerization of mono-1-olefins. However, vanadium catalysts have not been as commercially successful as titanium or chromium catalysts for olefin polymerization. Supported vanadium catalysts have been particularly disappointing as olefin polymerization catalysts. To a substantial extent, the greatest success with vanadium in the prior art is an olefin polymerization catalyst which has been in systems more analogous to unsupported titanium systems, i.e. $VOCl_3$, $VCl_4$ or $VCl_3$ used with a reducing agent such as an aluminum hydride. However, the natural tendency of vanadium to catalyze reactions other than polymerization has been a constant problem limiting its usefulness in olefin polymerization.

It would be desirable in some applications to be able to obtain a supported system having the kind of molecular weight sensitivity to hydrogen that is displayed by unsupported titanium catalyst systems.

SUMMARY OF THE INVENTION

It is an object of this invention to provide a supported vanadium catalyst system;

it is a further object of this invention to provide a vanadium catalyst system capable of giving high productivity; it is yet a further object of this invention to provide a supported catalyst system having high sensitivity to hydrogen for molecular weight control;

it is yet a further object of this invention to provide a supported catalyst system capable of giving broad molecular weight distribution; and it is yet a further object of this invention to provide a superior olefin polymerization process.

In accordance with this invention, a calcined vanadium catalyst on a refractory support is treated with titanium tetrachloride or $TiORCl_3$ and used with a trihydrocarbylaluminum cocatalyst. In a preferred embodiment the calcined vanadium catalyst is reduced prior to contact with the titanium component.

DESCRIPTION OF THE PREFERRED EMBODIMENTS

This support can be any porous refractory material conventionally utilized in catalytic reactions. Suitable supports include catalytic grade silica such as Davison 952MS, alumina such as Ketjen Grade B, magnesium oxide, amorphous aluminum phosphate having a phosphorus to aluminum rate of 0.1 to 1, or phosphated alumina. Any combination of the above supports such as silica-alumina or any combination of mixtures thereof can also be used.

The vanadium compound can be any vanadium comound convertible on calcination to an oxide. Preferred compounds are organic vanadates such as butylvanadate or inorganic vanadium compounds such as ammonium vanadate. The chlorides such as vanadium chloride are least preferred, but can be used since the chlorine will be removed during the calcination.

The vanadium compound is impregnated onto the support utilizing either an aqueous solution of a water-soluble vanadium compound or if the vanadium compound is soluble in organic solvents such as alcohol or hydrocarbons then a solution in a nonaqueous solvent can be utilized.

Since the invention is broadly applicable to any porous refractory support and not particularly sensitive to the surface structure of the support, considerable leeway is possible in the drying of the impregnated support. Of course, if a support known to have very fragile pores is used then some care in the drying must be exercised as is well known in the art, but in general the support can be dried simply by heating, spray drying, vacuum drying or any other conventional drying technique.

It is essential to the invention that the supported vanadium catalyst be calcined prior to contact with the titanium component. This can be done at a temperature within the range of 200° to 800° C., preferably 300° to 500° C. Any oxygen containing ambient gas can be utilized although for the purpose of simplicity and economy the calcining will generally take place in air.

In a preferred embodiment, the calcined supported vanadium catalyst is subjected to a reducing treatment prior to contact with the titanium component. The effect brought about by this reducing treatment is not thoroughly understood but it has been found to give a surprising additional benefit to the catalyst. Any known reducing agent conventionally employed in reducing catalytic materials can be utilized. The preferred reducing agent being carbon monoxide. Also suitable is hydrogen and metal alkyls wherein the metal is selected from aluminum, zinc, magnesium, and boron, boron by definition being arbitrarily included as a metal. It can be speculated that the surprising beneficial effect of the reducing treatment is the result of changing the plus 5 vanadium oxide to a lower valent vanadium component, for instance, a vanadium oxide in the plus 2 or plus 3 valence state.

The titanium component can be $TiCl_4$ or a $TiORCl_3$ where R is an alkyl of 2 to 10 carbon atoms. The preferred material is titanium tetrachloride.

The cocatalyst must be a trihydrocarbylaluminum compound, the hydrocarbyl groups having 1 to 10 carbon atoms. Preferably, the cocatalyst is a trialkylaluminum compound having 2 to 4 carbon atoms, the most preferred compound being triethylaluminum.

The cocatalyst can be premixed with the catalyst or added as a separate stream to the reactor, the latter generally being preferred because of simplicity.

The catalysts of this invention are of utility in slurry, solution or gas phase polymerizations of the type well known in the art.

The catalysts produced in accordance with this invention can be used to polymerize at least one mono-1-olefin containing 2 to 8 carbon atoms per molecule such as ethylene, propylene, 1-butene, 1-pentene, 1-hexene, and 1-octene. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. Typically, predominantly ethylene copolymers are prepared using 0.5 to 20 weight percent comonomer as described above in the feed, preferably sufficient comonomer being used to give 97 to 99.6 weight percent polymerized ethylene units in the resulting copolymer.

Hydrogen can be used to control molecular weight thus allowing production with a single catalyst of polymers of varying molecular weight ranging from high load melt index of 0 to a high load melt index of 10 or greater. Hydrogen, when utilized is employed in a manner well known in the art and is generally used in an amount within the range of 0 to 300 psi, preferably 20 to 100 psi.

EXAMPLE I

The catalysts described in this Example were made by impregnating 2 weight percent vanadium as an aqueous solution of ammonium vanadate on Davison 952 silica (see Example II for surface properties) and calcining at 500° C. in air for 3 hours. In some instances the vanadium was subsequently reduced with carbon monoxide or reduced by adding 2 weight percent magnesium as dibutylmagnesium to the catalyst subsequent to the oxidation and prior to contact with the titanium component to reduce the vanadium to a blue lower valent state. In the runs indicated a fluorocarbon activator was added to the reactor mid-way through the polymerization run but as noted it had no measurable effect on the activity of the catalyst. The cocatalyst was either triethyl aluminum (TEA) or ethyl aluminum dichloride (EADC). The cocatalyst was added as a separate stream in an amount of 1 cc of 15 weight percent solution (25% for EADC). Polymerization temperature was 80 C. The following Table I gives the results of these runs.

TABLE I

| Run No. | Reduced | TiCl$_4$ | Cocatalyst | Prod./Time | Productivity g/g/catal./hr |
|---|---|---|---|---|---|
| 1 | No | No | TEA* | 86/45 g/min | 115 |
| 2 | No | Yes | TEA* | 208/40.7 g/min | 307 |
| 3 | No | Yes | TEA* | 177/44.5 g/min | 239 |
| 4 | Yes-CO | No | TEA* | 39/32.6 g/min | 72 |
| 5 | Yes-CO | Yes | TEA* | 1205/46.0 g/min | 1571 |
| 6 | Yes-Mg*** | No | TEA | 75/23.3 g/min | 193 |
| 7 | Yes-Mg*** | Yes | TEA | 2857/27.6 g/min | 6211 |
| 8 | No | No | EADC* | 953/42.6 g/min | 1342 |
| 9 | No | Yes | EADC* | 96/43.6 g/min | 132 |
| 10 | Yes-CO | No | EADC | 338/30.3 g/min | 669 |
| 11 | Yes-CO | No | EADC** | 241/30.6 g/min | 473 |
| 12 | Yes-CO | Yes | EADC | 272/45.8 g/min | 356 |
| 13 | Yes-Mg*** | No | EADC | 56/32.0 g/min | 105 |
| 14 | Yes-CO | Yes | TEA + H$_2$ | 366/45.6 g/min | 482 |

*After 30 minutes, 1 ml of 18 percent (CFC12)$_2$ activator in heptane solution was added to reactor. In each case the polymerization rate did not improve, or even change very much, which is unlike the effect with vanadium chloride catalysts.
**The activator was added from the beginning of the run.
***Mg means that the vanadium oxide was reduced (before the TiCl$_4$ treatment by adding 2% Mg as dibutyl magnesium, causing a color change to blue.

These results show the most active combination is the reduced catalyst with titanium tetrachloride and TEA cocatalyst. With TEA, reduction hurts productivity without the TiCl$_4$ but helps with the TiCl$_4$. With EADC, reduction always hurts the productivity and so does the presence of TiCl$_4$. Run 14 shows the effect of utilizing hydrogen to bring about a dramatic increase in melt index, i.e. lower molecular weight. Run 14 gave a MI of 0.205 (ASTM 1238-65%, a HLMI, of 6.85 ASTM 1238-65T, condition F) and a HLMI/MI ratio of 33.4. The other runs made without hydrogen had a melt index of 0.

The above runs were made as a part of a coordinated series of runs designated to eliminate extraneous variables. Previously several runs were made where polymerization conditions were not contact between the invention and control runs and there was some scatter in the prior data. These are reported hereinbelow as Example II.

EXAMPLE II

Part 1

In this part of Example II, the preparation of several vanadium-impregnated olefin polymerization catalysts is described. 57.2 grams of Davision Type 952 silica activated overnight in air at 200° C. (having a BET/N$_2$ surface area of 280 m$_2$/g, and a pore volume of about 1.6 cc/g determined by alcohol absorption) was slurried with a solution of 2.6 grams of NH$_4$VO$_3$ in about 500 ml of H$_2$O. The solvent was removed by evaporation under vacuum at a slightly elevated temperature. Drying was finished on a hot plate. The impregnated silica containing about 2 weight percent V was activated by calcination in air at 300° C. for about 2 hours. This catalyst is labeled Catalyst A.

About 30 ml of Catalyst A was slurried with about 50 ml n-heptane. After addition of about 3.0 TiCl$_4$, the slurry was refluxed for about 1 hour. This catalyst was washed with n-heptane followed by decantation of the wash liquid. Washing was repeated with n-pentane, which was also decanted. This catalyst (Catalyst B) was dried by evaporation of the solvent under nitrogen.

2.7 gram of Catalyst A were slurried in about 10 ml n-heptane. Then 1.3 ml of a 12.6 weight percent solution of n-butyl-sec-butyl-magnesium in n-heptane was added (so as to provide 0.5 weight percent Mg on silica which turned black. The slurry was heated to boiling for about 10 minutes. Then 1.0 ml of TiCl$_4$ was added. The formed Catalyst C was washed and dried as described for Catalyst B.

56.3 grams of Davison 952 silica were impregnated with vanadium to provide about 2 weight percent V on silica) by heating with an aqueous solution of 2.6 grams ammonium vanadate. The catalyst was dried by heating under vacuum conditions and then activated by calcination at 500° C. in air for about 2 hours. This control catalyst, labeled Catalyst D, was very similar to Catalyst A (with the exception of a higher calcination temperature). The preparation of another control catalyst, Catalyst E, was identical to that of Catalyst D, except that the activation was carried out by heating at 500° C. in air saturated with CCl$_4$ vapor.

EXAMPLE II

Part 2

In this part of Example II the polymerization of ethylene on the catalysts prepared in Part 1 is described. All polymerization runs were carried out in a stirred 1-gallon stainless steel autoclave (Autoclave Engineering, Inc.; Erie, PA) with 0.3-2.1 grams of a vanadium-impregnated silica catalyst, about 1 ml of 15-25 weight percent cocatalyst solution, 1.2 liters of isobutane, 300-400 psig ethylene, 0-100 psig hydrogen. Polymerization conditions and results of polymerization reactions are summarized in Table II.

TABLE II

| Run # | Catalyst Type | Catalyst gms. | Reduced | TiCl4 | Cocat. | Temp. °C. | Press. (psig) C2H4 | Press. (psig) H2 | Reaction Time (min) | Yield (gms.) | Density (g/cc) | Productivity (g/g/hr) | Flow |
|---|---|---|---|---|---|---|---|---|---|---|---|---|---|
| 15 Control | B | 0.620 | N | Y | EADC | 81 | 400 | 0 | 65 | 108 | .9434 | 174 | — |
| 16 Invention | B | 0.755 | N | Y | TEA | 99 | 400 | 0 | 10 | 311 | .9466 | 2470 | — |
| 17 Invention | B | 0.340 | N | Y | TEA | 80 | 300 | 100 | 48 | 77 | .9616 | 280 | HLMI = 0, HI = 20.2 |
| 18 Invention | C | 0.375 | Y | Y | TEA | 81-90 | 400 | 0 | 54 | 826 | .9350 | 2450 | — |
| 19 Invention | C | 0.389 | Y | Y | TEA | 80-81 | 300 | 100 | 40 | 195 | .9597 | 750 | HLMI = 5.7, HI = 11.9 |
| 20 Control | D | 0.531 | N | N | EADC | 81 | 400 | 0 | 30 | 432 | .9316 | 1630 | — |
| 21 Control | D | 0.440 | N | N | DADC | 80 | 300 | 100 | 25 | 117 | .9623 | 640 | HLMI = 152, HI = 16.0 |
| 22 Control | D | 2.061 | N | N | EADC | 80 | 300 | 100 | 40 | 385 | .9635 | 280 | — |
| 23 Control | E | 0.726 | N | N | EADC | 81-82 | 400 | 0 | 60 | 860 | .9302 | 1180 | — |
| 24 Control | E | 0.662 | N | N | TEA | 80 | 400 | 0 | 61 | 260 | .9392 | 390 | — |

N = No
Y = Yes

There is scatter in these early runs because of failure to keep all variables constant, and thus the runs of Example I are more meaningful. Nevertheless, a comparison of control Run 1 with invention Run 16 shows an advantage in productivity for the trihydrocarbyl aluminum cocatalyst. A comparison of control run 24 with invention run 16 shows an advantage for the TiCl4 treatment. Invention runs 17 and 19 appear out of place but this in part reflects the adverse effect of the hydrogen on productivity. A comparison of inventive runs 16 and 18 indicates the further advantage for the prereduction step.

While this invention has been described in detail for the purpose of illustration, it is not to be construed as limited thereby but is intended to cover all changes and modifications within the spirit and scope thereof.

I claim:
1. A method of producing a catalyst comprising:
   (a) impregnating a vanadium compound onto a particulate refractory support;
   (b) subjecting the thus supported vanadium composition to calcination;
   (c) thereafter contacting the thus calcined supported vanadium catalyst with a titanium component selected from TiCl4 and TiORCl3 wherein R is a 1 to 10 carbon atom alkyl group; and
   (d) contacting the resulting catalyst with a trihydrocarbylaluminum cocatalyst.
2. A method according to claim 1 wherein said calcined supported vanadium catalyst is subjected to a reducing treatment prior to said contact with said titanium component.
3. A method according to claim 2 wherein said reducing treatment is carried out utilizing carbon monoxide.
4. A method according to claim 1 wherein said vanadium compound is selected from organic vanadates and inorganic vanadates.
5. A method according to claim 4 wherein said vanadium compound is ammonium vanadate.
6. A method according to claim 1 wherein said calcining is carried out at a temperature of 300° to 500° C. in air.
7. A method according to claim 1 wherein said titanium component is TiCl4.
8. A method according to claim 1 wherein said trihydrocarbylaluminum compound is a trialkylaluminum having 2 to 4 carbon atoms per alkyl group.
9. A method according to claim 8 wherein said trialkylaluminum compound is triethylaluminum.
10. A method according to claim 9 wherein said calcined supported vanadium catalyst is subjected to a reducing treatment prior to said contact with said titanium component.
11. A method according to claim 10 wherein said reducing treatment is carried out utilizing carbon monoxide.
12. A catalyst produced by the method of claim 10.
13. A catalyst produced by the method of claim 1.

* * * * *